US012344493B2

(12) United States Patent
Shahin et al.

(10) Patent No.: US 12,344,493 B2
(45) Date of Patent: Jul. 1, 2025

(54) PRIMER APPARATUS

(71) Applicant: Hewlett-Packard Development Company, L.P., Spring, TX (US)

(72) Inventors: Aviv Shahin, Ness Ziona (IL); Keren Nadav, Ness Ziona (IL); David Oesterreicher, Ness Ziona (IL); Eyal Joseph, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 402 days.

(21) Appl. No.: 17/766,621

(22) PCT Filed: Nov. 11, 2019

(86) PCT No.: PCT/US2019/060767

§ 371 (c)(1),
(2) Date: Apr. 5, 2022

(87) PCT Pub. No.: WO2021/096484

PCT Pub. Date: May 20, 2021

(65) Prior Publication Data

US 2023/0249933 A1 Aug. 10, 2023

(51) Int. Cl.

*B65H 27/00* (2006.01)
*B41F 19/00* (2006.01)

(Continued)

(52) U.S. Cl.

CPC ........... *B65H 27/00* (2013.01); *B41F 19/001* (2013.01); *B41F 31/22* (2013.01); *B41F 31/26* (2013.01);

(Continued)

(58) Field of Classification Search

CPC ........ B41F 27/105; B41F 27/14; B41F 19/18; B41P 2270/20

See application file for complete search history.

(56) References Cited

U.S. PATENT DOCUMENTS 3,146,709 A * 9/1964 Bass ........................ B41C 1/182
101/401.3
4,381,709 A * 5/1983 Katz ..................... B41F 27/105
492/4

(Continued)

FOREIGN PATENT DOCUMENTS

CA 2026954 C 5/1997
CN 1042686 A 6/1990

(Continued)

*Primary Examiner* — Jason L Vaughan
(74) *Attorney, Agent, or Firm* — Jordan IP Law, LLC

(57) ABSTRACT

A primer roller may include a cylinder having an outer support surface. The outer support surface support surface may have a length in an axial direction and a fixed outer diameter extending along the length. The roller may further comprise, at least at least one elastically deformable annular sleeve having an axial length less than the axial length of the support surface of the cylinder an external diameter greater than the outer diameter of the support surface of the cylinder, and an internal diameter which provides a friction fit on the support surface of the cylinder. The outer surface of the support roller comprises a plurality of fluid outlets. The outlets are distributed about the support surface. Fluid expelled from the fluid outlets enables the sleeve to be slidably positioned relative to the support surface. A priming apparatus and a print press are also disclosed.

10 Claims, 3 Drawing Sheets

(51) Int. Cl.
*B41F 31/22* (2006.01)
*B41F 31/26* (2006.01)

(52) U.S. Cl.
CPC ................. *B65H 2301/5114* (2013.01); *B65H 2404/1122* (2013.01); *B65H 2404/1364* (2013.01)

(56) References Cited

U.S. PATENT DOCUMENTS 4,624,184 A * 11/1986 Katz ..................... B41F 27/105 279/2.08
4,685,393 A * 8/1987 Saueressig .............. B41F 13/10 101/375
5,086,701 A 2/1992 Gasparrini et al.
5,209,179 A 5/1993 Herbert et al.
5,216,954 A * 6/1993 Thompson ............ B41F 27/105 492/45
5,544,584 A 8/1996 Thompson et al.
5,706,731 A * 1/1998 Francille ................. B41F 27/14 492/48
5,711,222 A * 1/1998 Taylor ................. B41F 27/1206 101/415.1
5,819,657 A 10/1998 Rossini
5,983,799 A * 11/1999 Lane, III ................... B32B 7/12 492/50
6,276,271 B1 * 8/2001 Busshoff ................. B41F 27/14 101/376
6,401,613 B1 * 6/2002 Gayle ................... B41F 27/105 101/479
6,401,615 B1 * 6/2002 Heinicke ............... B41F 27/105 101/389.1
6,792,858 B2 * 9/2004 Kolbe ..................... B41F 30/04 101/376
7,124,685 B2 * 10/2006 Re ........................... B41F 13/10 101/376
7,290,488 B2 11/2007 Petersen et al.
9,120,302 B2 9/2015 Rossini
10,099,470 B2 10/2018 Wientjes
2002/0162467 A1 * 11/2002 Palmatier ................ B41F 30/04 101/375
2003/0024474 A1 2/2003 Suzuki et al.
2005/0257706 A1 * 11/2005 Simon ................... B41F 27/105 101/376
2007/0256583 A1 * 11/2007 Ahler ........................ B41N 6/00 101/375
2008/0250960 A1 * 10/2008 Taylor ................... B41F 27/005 29/464
2009/0193991 A1 8/2009 Rossini
2010/0206193 A1 * 8/2010 Songer .................. B41F 27/105 101/375
2013/0036596 A1 2/2013 Songer
2015/0283829 A1 10/2015 Gazit
2018/0022084 A1 1/2018 Byrne et al.

FOREIGN PATENT DOCUMENTS

CN 1026876 C 12/1994
CN 102395470 A 3/2012
EP 1126975 A1 8/2001
JP 63-030165 U 2/1988
WO 01/17778 A1 3/2001

* cited by examiner

Figure 2A
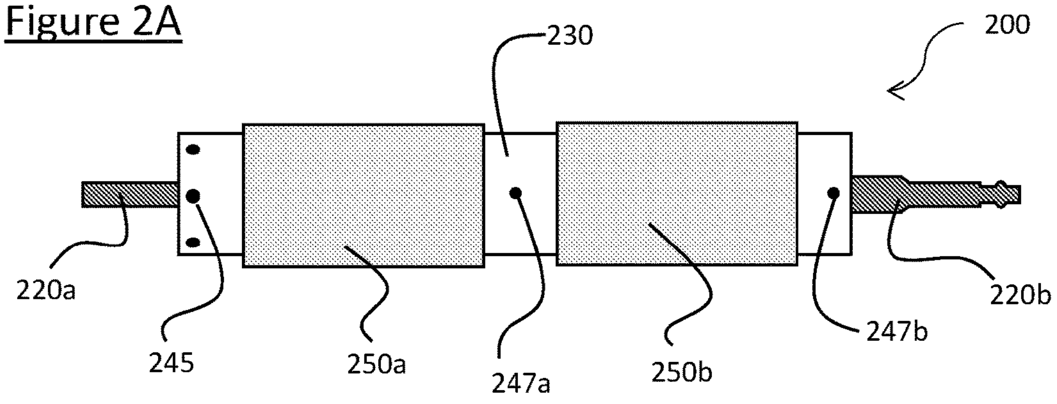
Figure 2B
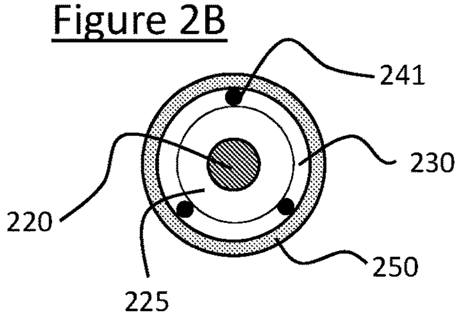
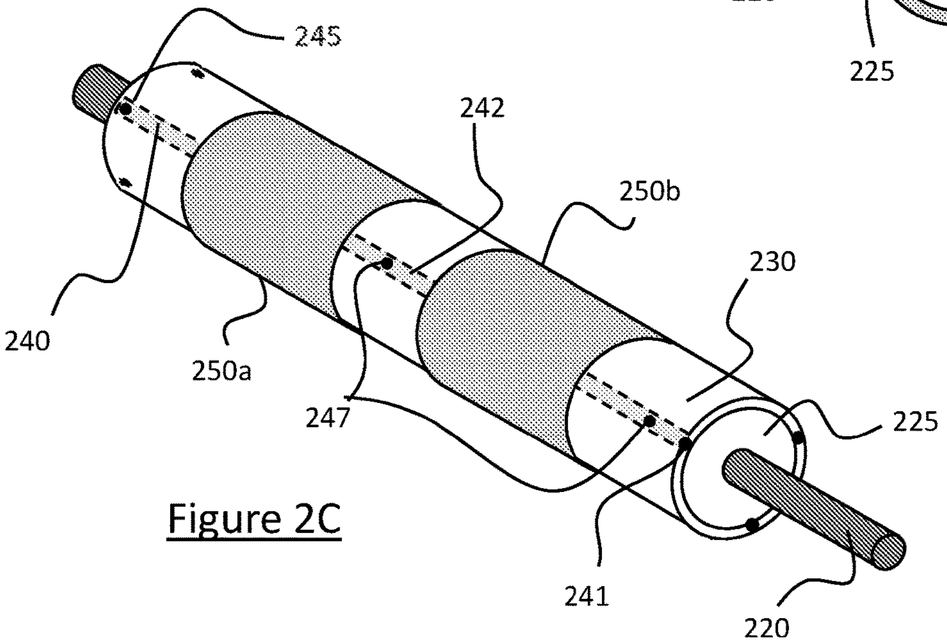
Figure 2C

PRIMER APPARATUS

BACKGROUND

Industrial print presses are able to print on a wide range of substrates (including, for example, paper, polypropylene, polyester, PVC and the like). For some combinations of substrate and printing fluid (such as ink) it may be a specified or beneficial that a primer layer is applied for example to facilitate ink transfer and/or adhesion.

Dedicated apparatus may be used to apply primer to a substrate and may include at least one roller for primer application. Some print presses may include a primer apparatus to enable primer to be applied to a substrate "inline". Such inline units may be modular in that they are a separate additional unit to the print press (and may be either installed with the print press during manufacturing or installed as a separate unit to an existing print press). A primer apparatus may, for example, be part of an inline unwinding and priming apparatus which can be used in feeding print substrate to the print engine of the print press.

BRIEF DESCRIPTION OF THE DRAWINGS

Various features of the present disclosure will be apparent from the detailed description which follows, taken in conjunction with the accompanying drawings, which together illustrate features of the present disclosure, and wherein:

FIGS. 2A, 2B and 2C are schematics of a priming roller in accordance with the present disclosure.

DETAILED DESCRIPTION

Figure 1:
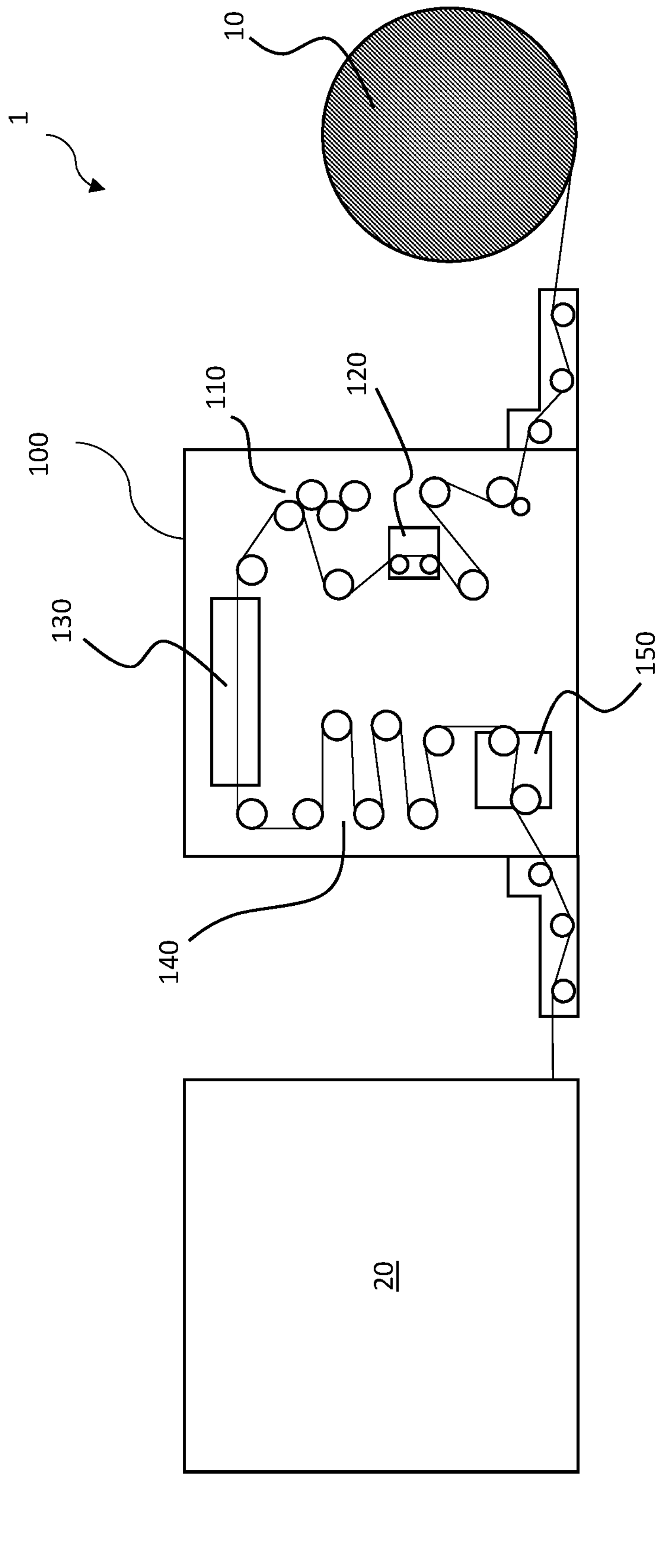
FIG. 1 is a schematic representation of a print press in accordance with an example of the present disclosure.

An industrial or commercial type print press 1 in accordance with the present disclosure is shown schematically in FIG. 1. The print press comprises a print engine 20 to print on a substrate which may for example be a digital offset printer. The print engine may be sheet or web fed with substrate from a supply, for example the web feed supply roll 10. In accordance with some examples of the present disclosure an inline primer apparatus 100 may be arranged between the supply 10 and the print engine 20.

The primer apparatus 100 may include at least one priming roller 110 (which may be part of a series of rollers as shown in FIG. 1) for applying primer to the substrate as it passes through the primer apparatus 100. As shown in the example the primer apparatus 100 may be both an unwinder and primer which unwinds web supply 10 from a roll, primes the substrate and then feeds the web to the print engine 20. In addition to the priming rollers 110 the primer apparatus may also include one or more of: a corona applicator 120, a dryer 130, a buffer 140 and a web handling system 150 (for example a web guide).

A primer apparatus 100 may need to accommodate different substrates, for example different substrate materials or thicknesses, and/or different priming and print patterns. For example, the web width of a substrate (or of the portion of the web width to be printed) may vary from one print job to another. Alternatively, or additionally, there may be a need to prime (and subsequently print) partial width lanes along the substrate with separating columns therebetween which are intentionally left un-treated by the primer apparatus 100. For example, such priming pattern may be used when using a web feed to print product or packaging labels which are individually relatively small compared to the substrate web. In other examples shrink sleeves may have non-primed areas for subsequent actions.

Accordingly, in some primer apparatus 100 it may be possible to remove at least one of the primer rollers 110 from the primer apparatus 100 so that the roller 110 can be interchanged. For example, the roller 110 may comprise an axle and/or mandrel which support an interchangeable roller cylinder that has a profile specific to a print/priming job. The roller or mandrel may for example have a machined body formed with circumferential recesses which define regions of the web which will not be primed. Such rollers may for example be made from rubber. As the roller cylinder in such arrangements is specific to a print job it may be appreciated that this may have associated manufacturing lead times and/or inventory management limitations that could impact print press usage.

Figure 3:
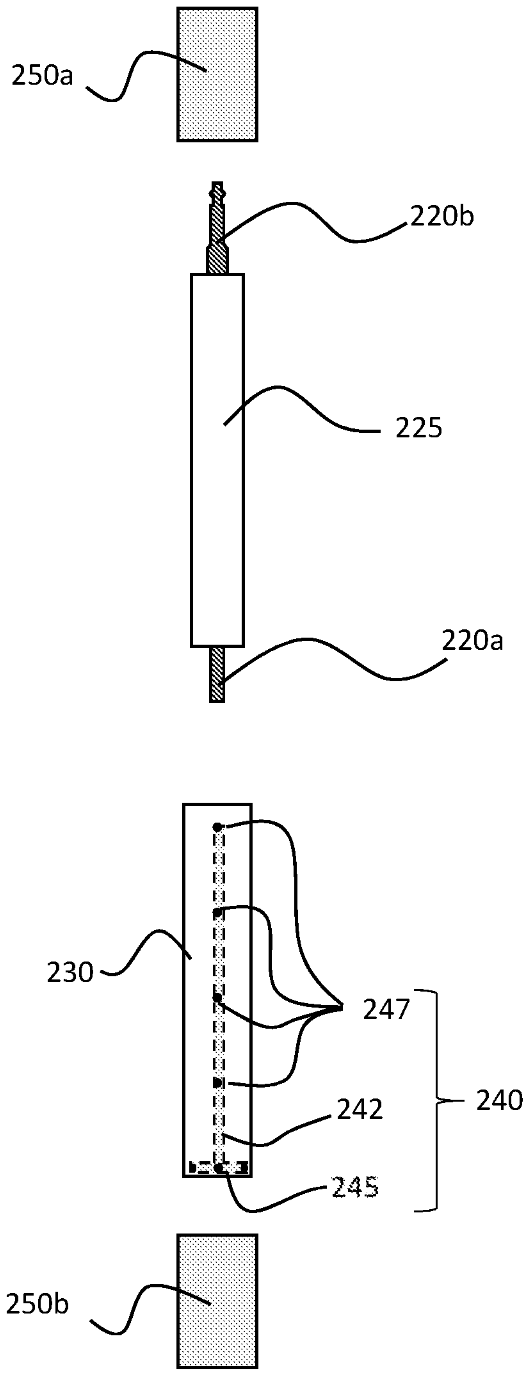
FIG. 3 is an exploded schematic of the priming roller of FIG. 2.

As shown in FIGS. 2 and 3 and explained further below, a primer roller 200 in accordance with examples of the present disclosure may provide an arrangement which can be set up to a particular print configuration without the need to maintain a stock of dedicated specifically manufactured rollers. This may, for example, reduce the risk of print press downtime between changeovers and/or may reduce delays whilst awaiting customized rollers for a new print job.

The roller 200 in accordance with the example may include a spindle 220 and a roller core 225 (which may be considered a mandrel, e.g., a solid cylindrical rod). The core 225 and spindle 220 may be integral or may be rotationally connected (for example including bearings). It may be noted that the spindle 220 may include first and second end portions 220*a* and 220*b* extending axially beyond the core 225 for mounting the roller 200 within the primer apparatus 100. The primer apparatus 100 may include a first side having an access opening (which may be a service side of the primer apparatus) and a second fixed side, which may for example include one or more roller drivers. In such an arrangement, a roller 200, or other component, may be inserted or removed from the primer apparatus 100 by being slid relative to the apparatus its axial direction. It may be noted that, as shown in FIGS. 2A and 3, the first end 220*b* of the shaft 220 may be profiled along its length for engagement with corresponding features of the primer apparatus 100 and it may be appreciated that such engagement features may be selected depending upon the primer apparatus 100 for which the roller 200 is to be used. The particular configuration of the primer apparatus 100 may determine the procedure for removal or adjustment of the roller 200. For example, in some arrangements of the apparatus the core or mandrel of the roller may be fixed relative to the primer apparatus and adjustment of the roller 200 may involve the removal of an adapter or sleeve from the core or mandrel.

The outside of the core 225 of the roller 200 supports an adapter cylinder 230. The core 225 and cylinder 230 may be engageable by any convenient arrangement. The core 225 and cylinder 230 may be reversibly connected such that the cylinder 230 can be removed from the core 225 (for example to allow set up) with the core 225 remaining in the primer apparatus 100. In at least some examples, the core may include an air feed system which enables relative sliding between the core 225 and cylinder 230. The cylinder 230 providing an outer support surface with a length in an axial direction. The axial length of the cylinder 230 may define the full width of the primer roller 200 when installed in the primer apparatus 100. The cylinder 230 has an inner diameter or shape which matches the outer diameter or shape of the core 225. The outer surface of the cylinder 230 has a fixed outer diameter extending along its full length. The cylinder 230 may be formed from aluminum and may for example include a protective surface coating.

In accordance with the present disclosure, the cylinder 230 may also include a fluid supply system 240. The fluid supply system 240 may comprises at least one inlet 241, which may for example be provided in a radial end wall of the cylinder 230. The, or each, inlet 241 may include a valve, for example a one-way sprung ball valve which is normally closed. The fluid supply 240 may include a plurality of fluid outlets 245, 247 in the outer surface of the cylinder 230. The fluid outlets 245, 247 may be in fluid communication with at least one inlet 241 via passageways or orifices 242 formed within the body of the cylinder 230. The passageways 242 enable pressurized fluid fed into the at least one inlet 241 to be distributed to the outlets 245, 247. The outlets 245, 247 may be distributed about the support surface of the cylinder 230. For example, the outlets 247 are arranged as a generally axially distributed array of apertures. The outlets 245 are arranged as a generally circumferentially distributed array of apertures. It may be appreciated that the fluid supply system 240 may be optimized depending upon the properties of the roller 200 (for example the dimensions of the roller). For example, the number of outlets 245 and 247 provided on the support surface of the cylinder 230 may be adjusted as part of the design and manufacture of the roller 200 to provide a suitable fluid flow in use. For example, a roller according to the disclosure may include four axial arrays 245 of fluid outlets and each axial array may be spaced apart around the circumference of the roller. For example, the cylinder may include an axial array at 0°, 90°, 180° and 270° locations. Each such axial array may include an outlet 245 spaced along the axial direction, for example by a fixed spacing.

The roller 200 of the disclosure may further comprise at least one elastically deformable annular sleeve 250 which may be installable on the adapter cylinder 230. Whilst the example shows a roller 200 provided with two sleeves 250 the number of sleeves installed on a roller will depend upon the print configuration for a given print job. The annular sleeves 250 may be formed from EPDM rubber and may for example have a thickness of between 5 to 10 mm and shore hardness of approximately 65°. The, or each, annular sleeve 250 is removably positionable on the outer surface of the cylinder 230. When assembled on the roller the sleeve may provide a primer applicator and portions of the cylinder 230 which are not covered by a sleeve may provide a circumferential recess or cut out, for example defining areas of the substrate where primer will not be applied. The roller 200 may, therefore comprise at least a first 250*a* and second 250*b* annular sleeve at axially spaced apart locations on the cylinder 230.

The or each annular sleeve 250 may have an axial length less than the axial length of the support surface of the cylinder 230. The or each annular sleeve 250 may for example have a minimum axial length of 100 mm. The external diameter of the, or each, annular sleeve 250 may be greater than the outer diameter of the support surface of the cylinder 230. The internal diameter of the, or each annular sleeve may be selected to provide a friction fit on the support surface of the cylinder 230. For example, as the annular sleeve is deformable the non-deformed internal diameter of the, or each annular sleeve 250 may be less than the outer diameter of the cylinder 230 (such that the sleeve will be retained firmly in place when positioned on the cylinder 230).

In use, the fluid supply system 240 may be used to enable at least one of plurality of interchangeable elastically deformable annular sleeve members 250 to be positioned on the cylinder 230 of the roller 200. When pressurized fluid (such as compressed air) is supplied to the inlet 241 it may be distributed by the fluid supply 240 and expelled from the outlets 245, 247 on the outer surface of the cylinder 230. Such fluid flow can act upon the inside surface of the annular sleeve 250 which is placed on the cylinder 230 such that it may be slid along the axial length of the roller 200. The fluid flow may provide a cushion or lubrication layer separating the surfaces of the cylinder 230 and the sleeve 250 during such set up. Once the sleeve is in a desired position, a user may switch off or detach the pressurize fluid supply and the elastically deformable annular sleeve members 250 will resiliently engage the outer surface of the cylinder 230. The resilient engagement between the cylinder 230 and sleeve 250 may, in the absence of fluid flow through the apertures, retain (and for example effectively lock) the sleeve in position relative to the roller 200.

To assist during set up, an external jig may be provided for supporting the cylinder 230. The jig may include or be arranged alongside a convenient source of pressurized fluid (such as compressed air). The jig may, for example, have an external profile which matches the external profile of the core 225 such that it may support the inner surface of a cylinder 230 (in the same manner as the core 225 would) when the cylinder is outside of the priming apparatus 100. A cylinder 230 may for example be pre-prepared on a jig by a user positioning the sleeve members 250 depending on the priming needs of the print task. When the print job change-over is due the priming apparatus 100 may be interrupted for a relatively short time period sufficient to remove one cylinder from the priming apparatus and replace that cylinder with the cylinder which has been pre-prepared on the external jig. As such, examples of the present disclosure may avoid excessive downtime for the priming apparatus 100 during change over between print tasks.

It may be appreciated from the above description that positioning one or more sleeves 250 on the cylinder 230 of the roller 200 may be used to provide an adaptable substrate priming configuration with non-primed lanes being positioned as specified for the print job. Whilst the above example may use two sleeves, dependent on the print applications more or less sleeves may be provided, for example three sleeves would provide two internal recessed lanes between the priming portions defined by the sleeves (and four sleeves would provide three lanes and so forth).

In contrast to specific machined rollers, the sleeves 250 may be repositioned and/or reused on a roller 200 for multiple print jobs. A user may maintain an inventory of sleeves of a variety of dimensions (for example thicknesses and/or widths) to allow a number or roller configurations to be used without, for example, maintaining an inventory of specific pre-machined rollers. A further benefit of arrangements in accordance with the present disclosure is that, even if the elastically deformable annular sleeve 250 is treated as a consumable, the roller 200 may generally be used many times without replacement.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A primer roller, comprising:

a cylinder providing an outer support surface with a length in an axial direction and a fixed outer diameter extending along the length, wherein the cylinder comprises an adapter cylinder extending along the length mounted on a roller mandrel cylinder extending along the length; and at least one elastically deformable annular sleeve having:

an axial length less than the axial length of the outer support surface of the cylinder, an external diameter greater than the outer diameter of the outer support surface of the cylinder, and an internal diameter which provides a friction fit on the outer support surface of the cylinder; and wherein the outer support surface of the cylinder comprises a plurality of fluid outlets, the outlets being distributed about the outer support surface, and wherein fluid expelled from the fluid outlets enables the sleeve to be slidably positioned relative to the outer support surface.

2. A primer roller as claimed in claim 1, wherein the adapter cylinder comprises the outer support surface, an inner surface to engage the roller mandrel cylinder and at least one fluid supply passage.

3. A primer roller as claimed in claim 2, wherein the inlet is provided on a radial end wall of the cylinder.

4. A primer roller as claimed in claim 1, wherein the plurality of fluid outlets are connected to a supply and the cylinder further comprises an inlet to provide pressurized fluid to the supply.

5. A primer roller as claimed in claim 1, wherein the plurality of fluid outlets includes at least one axially extending array of outlets.

6. A primer roller as claimed in claim 1, wherein the plurality of fluid outlets includes at least one circumferentially extending array of outlets.

7. A primer roller as claimed in claim 6, wherein the at least one circumferentially extending array of outlets are proximal to an end of the cylinder.

8. A primer roller as claimed in claim 1, the at least one elastically deformable annular sleeve comprising a plurality of elastically deformable annular sleeves to be positioned at axially spaced apart locations on the cylinder.

9. A primer roller as claimed in claim 1, wherein the at least one deformable annular sleeve has a thickness of approximately 5 to 10 mm.

10. A primer roller as claimed in claim 1, wherein the at least one deformable annular sleeve has a shore hardness of approximately 55 to 65.

* * * * *